Oct. 3, 1950   E. M. SPLAINE   2,524,717
OPHTHALMIC MOUNTING
Filed Dec. 24, 1947

INVENTOR.
EDWARD M. SPLAINE
BY
Louis L. Gagnon
ATTORNEY

Patented Oct. 3, 1950

2,524,717

UNITED STATES PATENT OFFICE 2,524,717

OPHTHALMIC MOUNTING

Edward M. Splaine, Southbridge, Mass., assignor to American Optical Company, Southbridge, Mass., a voluntary association of Massachusetts Application December 24, 1947, Serial No. 793,609

3 Claims. (Cl. 88—41)

This invention relates to improvements in ophthalmic mountings and particularly to novel strain absorbing means for supporting the temple members of such mountings.

The principal object of this invention is the provision of an ophthalmic mounting with novel means for imparting greater resiliency to its temple supporting members.

Another object is the provision in an ophthalmic mounting of improved means for absorbing stresses imposed upon a temple member, thus preventing possible damage or breakage to the mounting.

Another object is the provision in an ophthalmic mounting of temple members attached to the lens supporting structure by a novel pivotal arrangement adjacent its hinge connection, said attachment having resilient characteristics whereby additional flexibility is attained in the structure.

Further objects are to provide, in a manner as hereinafter set forth, an ophthalmic mounting which is simple in its construction and arrangement, strong, durable, thoroughly efficient in its use, readily assembled, and comparatively economical to manufacture.

Other objects and advantages of the invention will become apparent from the following description taken in connection with the accompanying drawing, in which, Figure 1 is a front elevation of an ophthalmic mounting embodying the invention;

Figure 1:
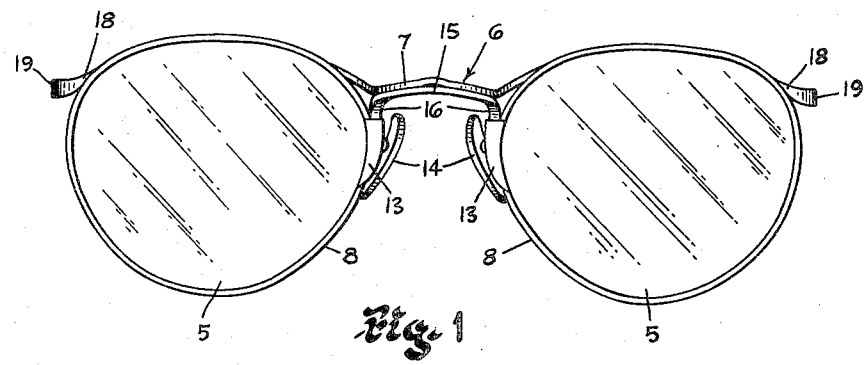

It is common knowledge that ophthalmic mountings of the class herein shown and described are often subjected to both various degrees of stress by the wearer of the mounting, particularly when the mounting is in the process of being placed in position on the face of the wearer or removed therefrom. The average wearer of such an ophthalmic mounting, not being familiar with the inherent characteristics of metals or non-metallic materials used in the manufacture of the mounting, is sometimes unconsciously inclined to handle the mounting in a rough manner, generally resulting in damage or breakage necessitating numerous repairs or replacements of parts. In the present construction it is desired to obviate some of the undesirable features necessitating costly repairs by providing a novel stress absorbing attachment for the temples of ophthalmic mountings whereby the wearer in donning or removing the mounting may unknowingly spread the temples beyond their normal limit with the attachment absorbing the excessive stress imparted to the temples and thereby preventing damage to the temple members or to the lenses.

This is accomplished by providing temple supporting members shaped substantially to follow only the upper contour edges of the lenses and spaced slightly to the rear of the lens holding rims. The members have one end fixedly secured to the supporting structure adjacent the bridge member and are pivotally connected to the rims at the temporal regions thereof. Pressure or strain exerted upon the temples will cause the pivoted temporal connections to act in the manner of fulcrums and thus resiliently assist in absorbing and cushioning any strain imposed upon the temples and prevent such strain from being transferred to the lenses or to other parts of the structure.

Referring more particularly to the drawing wherein like characters of reference denote like parts throughout the several views, the ophthalmic mounting includes a pair of lenses 5 carried by a supporting structure or frame 6. The supporting structure consists of a main bridge member 7 having soldered or otherwise fixedly secured thereto a pair of spaced rims 8 in which lenses 5 are adapted to be located and retained by conventional means. In the present construction there is shown a peripheral ridge portion or bevel 9 (Figure 3) formed around the entire periphery of the lenses 5 and adapted to reside within a V-groove 10 formed on the inner surface of the rims 8, with each rim 8 being mounted completely around the lens and split in the nasal vicinity to facilitate assembly, the ends thereof being joined by suitable means such as pins, screws or rivets 11 (Figure 2) adapted to extend through concentric openings in small lugs 12 formed adjacent the abutting ends of the rims 8. To conceal this connection a decorative plate or shield 13 is adapted to be mounted in any suitable manner over the front thereof.

The usual conventional nasal pads 14 are supported by an auxiliary bridge member 15 which is fixedly attached to the under surface of the main bridge member 7, and forming a part thereof, being shaped to conform substantially therewith, and having spaced downwardly projecting end portions 16 fixedly connected to the rim lugs 12. The end portions 16 serve to carry curved guard arms 17, the arms 17 having one end soldered or otherwise immovably attached to the portions 16, the other end of the arms 17 having adjustably mounted thereon the nasal pads 14.

Fixedly attached to the rear surface of the frame 6 in the vicinity of the junction of the main bridge member 7 and rims 8 are one end of a pair of spaced transversely disposed temple supporting members or arms 18, each arm 18 adapted to extend along and shaped to follow substantially only the upper contour edge of each lens 5 and spaced slightly to the rear of the rims 8, thereby being comparatively inconspicuous when viewed from the front. Each arm 18 terminates in an outwardly and rearwardly extending end portion 19 supporting one end of a temple member 20 which is movably secured thereto by means such as hinge 21.

Figure 3:
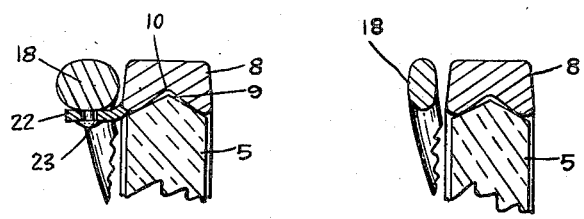
Figure 3 is a fragmentary sectional view taken on line 3—3 of Figure 2.

Formed on the rear surface of each rim 8 in the temporal regions of the mounting is a rearwardly projecting lug or shelf 22 having a vertical opening therein, the shelf 22 extending slightly below the temple supporting member 18. A pin 23 is adapted to be located in the lower surface of the member 18, and projects downwardly through the opening in the plate 22 being headed over at its lower end, as shown in Figure 3, the pin also being of substantially smaller diameter than the opening, thus forming a fulcrum connection.

Figure 2:
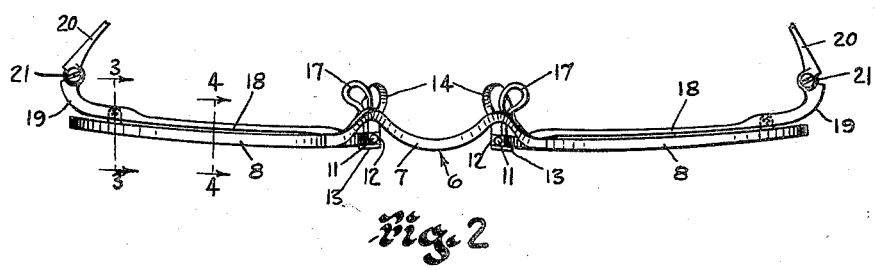
Figure 2 is a plan view of the mounting illustrated in Figure 1.
Figure 4:
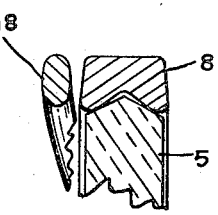
Figure 4 is a fragmentary sectional view taken on line 4—4 of Figure 2.
Figure 5:
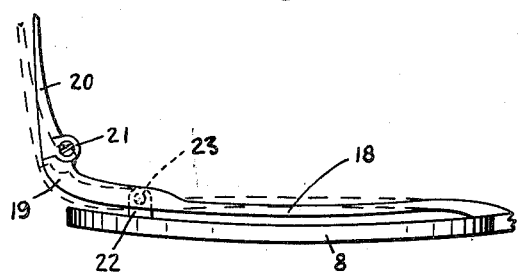
Figure 5 is a fragmentary plan view illustrating the resilient characteristics of one of the temple supporting connections.

The arms 18 are substantially thinned, flattened or otherwise resiliently shaped to impart flexibility thereto as shown in Figs. 2 and 4. Thus, it will be seen that when stress is imposed upon the temple members 20 such as by spreading them beyond their normal flexing capacity the arms 18 and end portions 19 will be made to pivot on pin 23, the pin functioning as a fulcrum to resiliently assist the temple members 20 to resist the strain. This pivoting action will result in the arms 18 being bent rearwardly, as shown in dotted outline in Fig. 5, within limits as governed by the clearances in the shelf 22 around the pin 23.

It is to be understood that although the foregoing description and the drawing refer particularly to a lens supporting structure or frame of the full rim type, whereby the peripheries of the lenses are completely enclosed by the supporting structure, it is possible to adapt the invention to a great variety of types such as the semi- or half-frame type. In the half-frame type the ends of the rims may be secured directly to the lenses if desired by straps or other suitable means, and the present invention may easily be incorporated in this construction.

It will be apparent that many other changes may be made in the details of construction and arrangement of parts shown and described without departing from the spirit of the invention as expressed in the accompanying claims. Therefore, it is to be understood that all matter set forth or shown in the accompanying drawing is to be interpreted as illustrative and not in a limiting sense.

I claim:

1. A lens supporting structure for the lenses of an ophthalmic mounting, said structure comprising a bridge, lens holding means to which the lenses are to be assembled, said lens holding means embodying a portion secured to the supporting structure adjacent the bridge, and a pair of outwardly extending bar-like temple supporting members each having one end fixedly secured to the supporting structure adjacent the bridge and following rearwardly and in spaced relation with the periphery of a respective lens when assembled therewith to adjacent the temporal side thereof and then turning rearwardly and terminating in temple hinge means, said lens holding means each embodying a rearwardly extending lug portion in the temporal region to which an adjacent portion of said temple supporting members is connected by means of a vertically disposed pin carried by one of said portions and seated in an opening formed in the other portion, said opening being of a diameter greater than the diameter of the pin, and with the part of the temple supporting member intermediate said temporal connection and its fixed connection adjacent the bridge being sufficiently flexible to permit the pin to turn in said opening in response to outward strain exerted on the temple hinge means of said supporting member during the use of the structure.

2. An ophthalmic mounting comprising a bridge, a pair of lens rims on its opposed sides having lenses therewith, a pair of outwardly extending bar-like temple supporting members each having one end fixedly secured adjacent the bridge and following rearwardly and in spaced relation the periphery of a respective rim to adjacent the temporal side thereof and then turning rearwardly and terminating in temple hinge means, and a perforated lug extending rearwardly from the temporal region of each of said rims to which an adjacent portion of a respective temple supporting member is connected by means of a vertically disposed pin fixed thereto and extending into the apertured portion of said lug, said apertured portion of the lugs each being of a diameter greater than the diameter of the respective pins and the part of the temple supporting members intermediate its pin and connection adjacent the bridge being of sufficiently smaller cross-section than the temporal part of said temple supporting members as to permit said temple supporting member to flex with said pin as a fulcrum for said flexing action in response to outward strain exerted on the temple hinge means during the use of the mounting.

3. A lens supporting structure for the lenses of an ophthalmic mounting, said structure comprising a bridge having lens rims on its opposed sides with which the lenses are to be assembled, and a pair of outwardly extending bar-like temple supporting members each having one end fixedly secured adjacent the bridge and following rearwardly and in spaced relation the periphery of a respective rim to adjacent the temporal side thereof and then turning rearwardly and terminating in temple hinge means, said rims each having a rearwardly extending lug portion in the temporal region thereof to which an adjacent portion of said temple supporting members is connected by means of a vertically disposed pin carried by said members and extending into an opening formed in the lug portion, said opening being of a diameter greater than the diameter of the pin, and with the part of the temple supporting member intermediate said temporal connection and its fixed connection adjacent the bridge being of oval shape in cross-section, its least dimension being in a plane disposed normal to the axis of said pin to permit said part to flex with the pin as a pivot, the part of said supporting members carrying the pin and turning rearwardly being of relatively circular cross-section so as to be retained to a fixed shape, said intermediate flexible portion responding to outward strain exerted on the temple hinge means during use of the structure.

EDWARD M. SPLAINE.

REFERENCES CITED

The following references are of record in the file of this patent:

UNITED STATES PATENTS

| Number | Name | Date |
|---|---|---|
| 1,335,508 | King | Mar. 30, 1920 |
| 2,188,380 | Uhlemann | Jan. 30, 1940 |
| 2,330,249 | Splaine | Sept. 28, 1943 |
| 2,341,338 | Splaine | Feb. 8, 1944 |
| 2,356,148 | Cozzens et al. | Aug. 22, 1944 |
| 2,363,978 | Lake | Nov. 28, 1944 |
| 2,436,606 | Rohrbach | Feb. 24, 1948 |